Jan. 18, 1966  J. WALTER  3,229,581
REAR-VIEW MIRROR ADJUSTABLE FROM WITHIN THE VEHICLE
Filed March 7, 1962

INVENTOR.
JOHANNES WALTER
BY *Dicke and Craig*

*ATTORNEY*

United States Patent Office 3,229,581
Patented Jan. 18, 1966

3,229,581
REAR-VIEW MIRROR ADJUSTABLE FROM WITHIN THE VEHICLE
Johannes Walter, Sindelfingen, Kreis Boblingen, Germany, assignor to Daimler-Benz Aktiengesellschaft, Stuttgart-Unterturkheim, Germany
Filed Mar. 7, 1962, Ser. No. 178,142
Claims priority, application Germany, Mar. 10, 1961, D 35,605
6 Claims. (Cl. 88—98)

The present invention relates to a rear-view mirror which may be adjusted by the driver of the vehicle from the inside theerof. The present invention is concerned with the problem of providing a simplified adjusting mechanism therefor by reducing the number of movable parts thereof, by increasing the reliability thereof during operation, and by reducing the manufacturing costs thereof.

The present invention resides in retaining the mirror at the outer end of a pin pivotally supported in its socket or base with a securely adjustable inclination with respect to the axis of the pin, and by securely connecting the inner end of the pin with a flexible shaft leading into the inside of the vehicle. The fastening of the mirror at the pin may thereby be made by means of a clamping collar slid upon or placed over the outer end of the pin, whereby the clamping screw of said clamping collar simultaneously connects the clamping collar in a securely adjustable manner with a small bearing lug fastened to the inside of the mirror housing.

Accordingly, it is an object of the present invention to provide a rear-view mirror structure for vehicles of the type described hereinabove which obviates the disadvantages and shortcomings of the prior art construction.

It is another object of the present invention to provide a rear-view mirror assembly, adapted to be adjusted from within the vehicle, which is simple in construction, reliable and safe in operation, and which requires relatively few parts to achieve these aims and purposes.

It is still a further object of the present invention to provide a rear-view mirror assembly, adapted to be readily adjusted by the driver from within the vehicle, which is not only relatively inexpensive in manufacture by reason of the relatively small number of parts involved but which is also simple and easy to install by requiring relatively few installation operations.

Another object of the present invention resides in the provision of a rear-view mirror assembly for vehicles, especially motor vehicles, that may be readily adapted, by simple adjustment from within the vehicle, to all changing requirements in traffic conditions as well as to the particulars of the driver.

Figure 1:
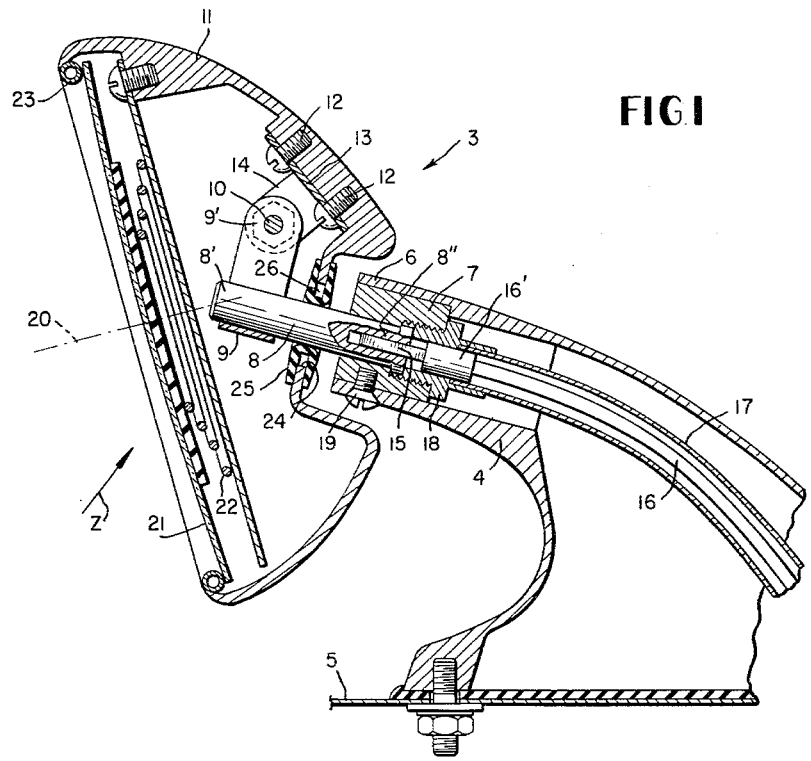
Figure 2:
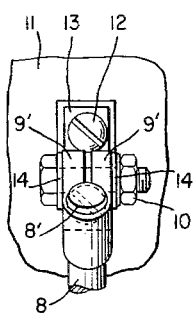

These and further objects, features and advantages of the present invention will become more obvious from the following description when taken in connection with the accompanying drawing which shows, for purposes of illustration only, one embodiment in accordance with the present invention, and wherein FIGURE 1 is a longitudinal cross sectional view through the rear-view mirror together with the socket thereof in accordance with the present invention, and FIGURE 2 is a partial front elevational view illustrating the mounting of the mirror on the pin as viewed in the direction of the arrow Z of FIGURE 1.

Referring now to the drawing, wherein like reference numerals are used throughout the two views to designate corresponding parts, and more particularly to FIGURE 1, thereof, reference numeral 3 generally designates therein the rear-view mirror which is fastened on the outside of the vehicle wall 5 by means of its neck-like, rearwardly-bent base or socket portion 4. A pin 8 which is pivotally mounted in a bushing 7 made of self-lubricating synthetic material protrudes with its outer end 8' beyond the free neck portion 6 of the socket or base 4. A clamping collar 9 is slid upon or emplaced over the outer pin end 8' and is tightened by means of a clamping screw 10.

A U-shaped small bearing lug 13 is mounted at the inner wall of the mirror housing 11 by means of screws 12. The sides or leg portions 14 of the bearing lug 13 receive therebetween the eye portions 9' of the clamping collar 9 and are rigidly connected with the eye portions 9' upon tightening of the clamping screw 10.

The free end 16' of a flexible shaft is inserted by means of a square or rectangularly sectioned portion 15 into the inner end 8" of the pin 8. The protective casing 17 of shaft 16 is connected with the bearing bushing 7 by means of a threaded sleeve 18. The bearing bushing 7 is held fast within the neck portion 6 of the socket 4 by means of a screw 19.

The flexible shaft 16 which extends through the inside of the socket 4 at a slight angle and through an aperture (not shown) provided in the vehicle wall 5 into the inside of the vehicle in any suitable, conventional manner, not shown herein in detail, leads to an adjusting knob or the like which is pivotally mounted, for example, on the instrument panel and which is adapted to be adjustably secured in any desired rotary position.

During mounting of the mirror on the vehicle, the inclination of the longitudinal axis 20 thereof with respect to the longitudinal axis of the pin 8 is so adjusted while the clamping screw 10 is slightly loosened, that for a driver of average height and in normal seating position, it provides the proper view over the activities and traffic conditions on the road behind the vehicle. When this has been done, the clamping screw 10 is permanently tightened. This basic adjustment of the mirror can be made in a relatively simple manner since the actual mirror surface 21, properly speaking, is retained so as to be easily removable within the housing 11 by means of a spring 22 disposed behind a rubber ring 23.

Once the basic adjustment of the mirror has been properly made, any desired adaptation or adjustment to a different height and, respectively, different seating position of a driver, or to a particular driving condition, such as, for example, when driving uphill, downhill, or in columns, may be readily made from within the vehicle by turning the adjusting knob (not shown) on the instrument panel. The mirror surface 21 thereby carries out, like an inclined or sloping pane, a rotary movement with a changing inclined position with respect to the longitudinal axis of the vehicle and thus is always adapted to be adjusted into an angular position suitable for the prevailing situation.

In order not to impair the basic adjustment of the mirror by the insertion of the pin 8 into the housing 11, the size of the inlet aperture 24 is made considerably larger than the diameter of the pin 8. For purposes of sealing the aperture 24, a rubber ring 25 is placed over the pin 8. This ring 25 is provided with a deep annular groove 26 in which the edge of the aperture 24 is displaced during tilting or pivoting of the mirror about the clamping screw 10. The pin 8 is relatively stiffly or tightly supported within the bushing 7 in order to prevent any undesired unintentional rotation of the mirror due to vibrations, shocks or wind forces occurring during travel.

While I have shown one preferred embodiment in accordance with the present invention, it is obvious that the same is not limited thereto, but is susceptible of many changes and modifications within the spirit and scope thereof, and I therefore do not wish to be limited to the details shown and described herein, but intend to cover all such changes and modifications as are encompassed by the scope of the appended claims.

I claim:

1. A rear-view mirror for vehicles, especially for motor vehicles, adapted to be adjusted from within the vehicle inside, comprising mirror means including a mirror housing and a mirror removably mounted within said housing, lug means fastened to the inside of said mirror housing, socket means for said mirror means including pin means having inner and outer ends and rotatably supported in said socket means, mounting means for mounting said mirror means on the outer end of said pin means at an angle to the axis of said pin means that is adapted to be adjusted in a predetermined plane, said mounting means including clamp means placed over said outer end of said pin means and tightening means for said clamp means which simultaneously operatively connects said clamping means with said lug means in a securingly adjustable manner providing for adjustment of said angle about an axis perpendicular to the axis of said pin means, and flexible shaft means operatively connected with the inner end of said pin means for remotely controlling said mirror.

2. A rear-view mirror for vehicles, especially for motor vehicles, adapted to be adjusted from within the vehicle inside, comprising mirror means including a mirror housing, substantially U-shaped lug means leg portions and fastened to the inside of said mirror housing, socket means for said mirror means including pin means having inner and outer ends and rotatbly supported at said inner end in said socket means, mounting means for mounting said mirror means on the outer end of said means at an angle to the axis of said pin means that is adapted to be adjusted in a predetermined plane, said mounting means including clamp means having eye portions and placed over said outer end of said pin means and tightening means for said clamp means which simultaneously operatively connects said clamping means with said lug means in a securingly adjustable manner in such a manner that said leg portions accommodate therebetween the eye portions of said clamp means providing for adjustment of said angle about an axis perpendicular to the axis of said pin means, and flexible shaft means operatively connected with the inner end of said pin means for remotely controlling said mirror.

3. A rear view mirror for vehicles, especially for motor vehicles, adapted to be adjusted from within the vehicle inside, comprising mirror means including a mirror housing, substantially U-shaped lug means having leg portions and fastened to the inside of said mirror housing, socket means for said mirror means including pin means having inner and outer ends and rotatably supported in said socket means, mounting means for mounting said mirror means on the outer end of said pin means with an inclination with respect to the axis of said pin means that is adapted to be adjustably secured, said mounting means including clamp means having eye portions and placed over said outer end and tightening means for said clamp means which simultaneously operatively connects said clamping means with said lug means in a securingly adjustable manner in such a manner that said leg portions accommodate therebetween the eye portions of said clamp means, and flexible shaft means operatively connected with the inner end of said pin means for remotely controlling said mirror, said mirror housing being provided with an aperture for said pin means that is considerably larger than the diameter of said pin means, and sealing means for sealing said aperture with respect to said pin means including an elastic ring provided with a relatively deep annular groove which receives therein the edge portions of said aperture.

4. A rear-view mirror for vehicles, especially for motor vehicles, adapted to be adjusted from within the vehicle inside, comprising mirror means including a mirror housing, substantially U-shaped lug means having leg portions and fastened to the inside of said mirror housing, socket means for said mirror means including self-lubricating bushing means and pin means having inner and outer ends and rotatably supported in a relatively tight manner within the bushing means of said socket means, mounting means for mounting said mirror means on the outer end of said pin means with an inclination with respect to the axis of said pin means that is adapted to be adjustably secured, said mounting means including clamp means having eye portions and placed over said outer end and and tightening means for said clamp means which simultaneously operatively connects said clamping means with said lug means in a securingly adjustable manner in such a manner that said leg portions accommodate therebetween the eye portions of said clamp means, and flexible shaft means operatively connected with the inner end of said pin means for remotely controlling said mirror, said mirror housing being provided with an aperture for said pin means that is considerably larger than the diameter of said pin means, and sealing means for sealing said aperture with respect to said pin means including an elastic ring provided with a relatively deep annular groove which receives therein the edge portions of said aperture.

5. A rear-view mirror for vehicles, especially for motor vehicles, adapted to be adjusted from within the vehicle inside, comprising mirror means including a dish-shaped mirror housing having a mirror mounted therein and an annular elastic ring means mounted about the open edge of said dish-shaped housing for retaining said mirror within said housing and spring means mounted within said housing for forcibly retaining said mirror in contact with said ring means so as to mount said mirror rigidly in position while also permitting its removal from said housing through deformation of said ring means, substantially U-shaped lug means having leg portions and fastened to the inside of said mirror housing, socket means for said mirror means including pin means having inner and outer ends and rotatably supported in said socket means, mounting means for mounting said mirror means on the outer end of said pin means with an inclination with respect to the axis of said pin means that is adapted to be adjustably secured, said mounting means including clamp means having eye portions and placed over said outer end and tightening means for said clamp means which simultaneously operatively connects said clamping means with said lug means in a securingly adjustable manner in such a manner that said leg portions accommodate therebetween the eye portions of said clamp means, and flexible shaft means operatively connected with the inner end of said pin means for remotely controlling said mirror.

6. A rear-view mirror for vehicles, especially for motor vehicles, adapted to be adjusted from within the vehicle inside, comprising mirror means including a dish-shaped mirror housing having a mirror mounted therein and an annular elastic ring means mounted about the open edge of said dish-shaped housing for retaining said mirror within said housing and spring means mounted within said housing for forcibly retaining said mirror in contact with said ring means so as to mount said mirror rigidly in position while also permitting its removal from said housing through deformation of said ring means, substantially U-shaped lug means having leg portions and fastened to the inside of said mirror housing, socket means for said mirror means including self-lubricating bushing means and pin means having inner and outer ends and rotatably supported in a relatively tight manner within the bushing means of said socket means, mounting means for mounting said mirror means on the outer end of said pin means with an inclination with respect to the axis of said pin means that is adapted to be adjustably secured, said mounting means including clamp means having eye portions and placed over said outer end and tightening means for said clamp means which simultaneously opertively connects said clamping means with said lug means in a securingly adjustable manner in such a manner that said leg portions accommodate therebetween the eye portions of said clamp means, and flexible shaft means operatively connected with the inner end of said pin means for remotely controlling said mirror, said mirror housing being provided with an aperture for said pin means that is considerably larger than the diameter of said pin means, and sealing means for sealing said aperture with respect to said pin means including an elastic ring provided with a relatively deep annular groove which receives therein the edge portions of said aperture.

References Cited by the Examiner

UNITED STATES PATENTS

| | | | |
|---|---|---|---|
| 2,456,362 | 12/1948 | Aves | 88—98 X |
| 2,573,127 | 10/1951 | Von Bredow. | |
| 2,734,997 | 2/1956 | Frady. | |
| 2,740,329 | 4/1956 | Morgenstern | 85—93 |
| 2,774,098 | 12/1956 | Tieri | 88—53 |
| 2,919,599 | 1/1960 | Milton et al. | 88—93 X |
| 2,947,856 | 8/1960 | Fox. | |

JEWELL H. PEDERSEN, *Primary Examiner.*